US011859766B2

(12) United States Patent
Takiguchi et al.

(10) Patent No.: US 11,859,766 B2
(45) Date of Patent: Jan. 2, 2024

(54) FUSIBLE PLUG

(71) Applicants: NIPPON PISTON RING CO., LTD., Saitama (JP); JTEKT CORPORATION, Kariya (JP)

(72) Inventors: Hiroshi Takiguchi, Shimotsuga-gun (JP); Atsuya Aoki, Shimotsuga-gun (JP); Kazushi Numazaki, Kariya (JP); Takeshi Takahashi, Kariya (JP); Natsuki Iwamoto, Kariya (JP); Yudai Watanabe, Kariya (JP)

(73) Assignees: NIPPON PISTON RING CO., LTD., Saitama (JP); JTEKT CORPORATION, Kariya (JP)

( * ) Notice: Subject to any disclaimer, the term of this patent is extended or adjusted under 35 U.S.C. 154(b) by 45 days.

(21) Appl. No.: 17/586,900

(22) Filed: Jan. 28, 2022

(65) Prior Publication Data

US 2022/0243872 A1 Aug. 4, 2022

(30) Foreign Application Priority Data

Jan. 29, 2021 (JP) ................................ 2021-012573
Dec. 23, 2021 (JP) ................................ 2021-208881

(51) Int. Cl.
*F17C 13/00* (2006.01)

(52) U.S. Cl.
CPC .... *F17C 13/002* (2013.01); *F17C 2201/0104* (2013.01); *F17C 2203/0643* (2013.01); *F17C 2205/0302* (2013.01); *F17C 2221/012* (2013.01); *F17C 2223/035* (2013.01); *Y10T 428/12042* (2015.01)

(58) Field of Classification Search
None
See application file for complete search history.

(56) References Cited

FOREIGN PATENT DOCUMENTS

| | | | | | |
|---|---|---|---|---|---|
| JP | 2003130240 A | * | 5/2003 | | |
| JP | 2005-331016 A | | 12/2005 | | |
| JP | 2005331016 A | * | 12/2005 | | |
| JP | 2006329374 A | * | 12/2006 | | |
| JP | 2010281463 A | * | 12/2010 | | |
| WO | WO-2014197151 A1 | * | 12/2014 | ............. | B22D 1/005 |

* cited by examiner

*Primary Examiner* — Seth Dumbris
(74) *Attorney, Agent, or Firm* — Oliff PLC

(57) ABSTRACT

A fusible plug for a high pressure gas cylinder includes a communication hole filled with a low melting point alloy, a porous metal sintered body is press-fitted in at least a part of the communication hole in a length direction, all or a part of the porous metal sintered body is impregnated with the low melting point alloy to solidify and composite the low melting point alloy. It is preferable that: the low melting point alloy has a melting point of 110° C.; the porous metal sintered body to be press-fitted is a porous metal sintered body having pores with an area ratio of 30% or more and 50% or less and having pores with a diameter exceeding 5 μm among the pores of 80% or more in terms of area ratio to all the pores; and the porous metal sintered body is a porous austenitic stainless steel sintered body.

11 Claims, 2 Drawing Sheets

FUSIBLE PLUG

BACKGROUND

Technical Field

The present invention relates to a fusible plug, and more particularly, to a fusible plug that is attached to a high pressure gas cylinder and, when the high pressure gas cylinder is exposed to an abnormal high temperature, can release a gas in the high pressure gas cylinder in a short time to prevent breakage of the container.

Related Art

A fusible plug has been used as a safety device of a high pressure container or equipment. The fusible plug has a role of a pressure relief device that opens the plug to release contents to the outside before the container or the equipment is damaged by an increase in internal pressure when the container or the equipment is exposed to a high temperature because of a fire or an accident. As an example of such a fusible plug, for example, there is a "fusible plug" proposed in JP 2005-331016 A. The fusible plug described in JP 2005-331016 A has a configuration in which a screw part for connection to high pressure equipment is formed at one end, a communication hole is provided inside, the communication hole is filled with low melting point metal (alloy), and a porous structure material is connected to the other end, and the low melting point alloy may penetrate into the porous structure material. In the fusible plug described in JP 2005-331016 A, when the high pressure container or the equipment reaches an abnormally high temperature, the low melting point alloy filled in the communication hole melts to release the communication hole, and the contents in the high pressure container or the equipment pass through the porous structure material and are released to the outside, so that breakage of the high pressure container or the like can be prevented.

SUMMARY

In order to avoid a situation such as explosion or breakage due to an increase in the internal pressure of the high pressure container described above, a safety device including a fusible plug for rapidly discharging contents (gas) is also required for the high pressure gas cylinder. However, the low melting point alloy used in the fusible plug is expensive and, in order to reduce an amount of use of the low melting point alloy, there is a strong tendency to downsize the fusible plug. In combination with the tendency to simplify the safety device, there is a demand for a structure in which pressure is directly applied to the fusible plug. For this reason, as fusible plug that is attached to a high pressure gas cylinder and appropriately operates as a safety device, an effective fusible plug has not yet been developed.

In view of the problem of the related art, an object of the present invention is to provide a fusible plug suitable as a safety device for a high pressure gas cylinder and having excellent pressure resistance. The term "high pressure" as used herein refers to pressure of 70 MPa or more. In addition, "excellent in pressure resistance" means having pressure resistance of 87.5 MPa or more.

In order to achieve the above object, the present inventors have intensively studied a structure of a fusible plug capable of appropriately operating even under high pressure. Usually, the low melting point alloy used in the fusible plug has low strength, and, therefore, when exposed to high pressure, the low melting point alloy filled in the fusible plug is displaced and the contents (gas) in the high pressure gas cylinder sometimes flow out to the outside. Therefore, as a method for reinforcing the low melting point alloy filled in the communication hole of the fusible plug, the present inventors have conceived of using a porous material having a large number of pores that can be impregnated with the molten low melting point alloy.

The present inventors have conceived of first press-fitting the porous material into the communication hole of the fusible plug and then impregnating all or a part of the porous material with the low melting point alloy to composite the low melting point alloy. Consequently, it has been found that the strength increase of the low melting point alloy filled in the communication hole of the fusible plug can be stably achieved and, even when the fusible plug is attached to the high pressure gas cylinder, the contents (gas) do not normally flow out to the outside and, when an abnormally high temperature or the like is encountered, the low melting point alloy can be melted and easily opened and the contents (gas) in the container can be caused to flow out of the container.

The present invention has been completed by further conducting studies based on such findings. That is, the gist of the present invention is as follows.

[1] A fusible plug for a high pressure gas cylinder, comprising: a communication hole; and a porous material attached to at least a part of the communication hole in a length direction, all or a part of the porous material being impregnated with a low melting point alloy to composite the low melting point alloy.

[2] The fusible plug for a high pressure gas cylinder according to [1], wherein the low melting point alloy is an alloy having a melting point of 110±5.5° C.

[3] The fusible plug for a high pressure gas cylinder according to [1] or [2], wherein the porous material is a porous metal sintered body having pores with an area ratio of 30% or more and 50% or less and having pores with a diameter exceeding 5 μm among the pores of 80% or more in terms of area ratio with respect to all the pores, the porous metal sintered body having transverse rupture strength of 50 MPa or more as measured by determination of transverse rupture strength conforming to provisions of Japan Powder Metallurgy Association Standard JPMA M09-1992.

[4] The fusible plug for a high pressure gas cylinder according to [3], wherein the porous metal sintered body is a porous austenitic stainless steel sintered body.

[5] The fusible plug for a high pressure gas cylinder according to any one of [1] to [4], wherein a compressive yield strength of a region formed by impregnating the porous material with the low melting point alloy to composite the low melting point alloy is 1.5 times or more the compressive yield strength of the low melting point alloy.

[6] The fusible plug for a high pressure gas cylinder according to any one of [1] to [5], wherein the fusible plug has pressure resistance of 87.5 MPa or more at an environmental temperature of 85° C.

According to the present invention, usually, the gas in the container does not flow out to the outside even under the environment of the high pressure gas and, on the other hand, when exposed to an abnormal high temperature, the communication hole is easily opened, the contents (high pressure gas) can be released, and the fusible plug which is effective as a safety device for a high pressure gas cylinder and is inexpensive can be provided, so that a remarkable industrial effect is exhibited. In addition, by forming the fusible plug using the porous austenitic stainless steel sintered body as the porous material, there is also an effect that corrosion resistance is improved and the fusible plug that can withstand long-term use can be obtained.

DETAILED DESCRIPTION

Figure 1A:
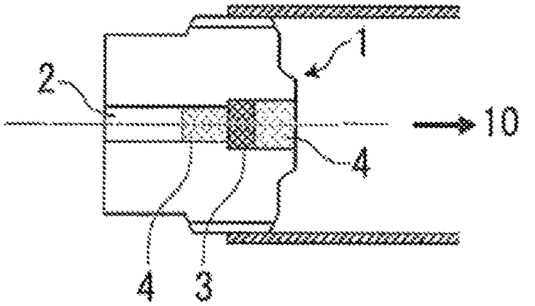
FIGS. 1A to 1H are explanatory diagrams showing an example of a cross-sectional structure of a fusible plug of the present invention.
Figure 1E:
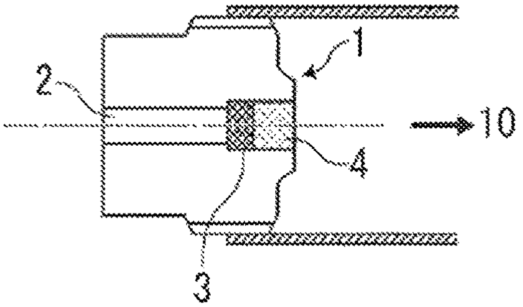

The present invention is a fusible plug suitable for a high pressure gas cylinder.

The fusible plug of the present invention is attached to a high pressure gas cylinder and acts to quickly release gas in the high pressure gas cylinder to the outside when the high pressure gas cylinder is exposed to an abnormally high temperature and normally acts not to release the gas in the high pressure gas cylinder to the outside.

The fusible plug includes a communication hole drilled so as to cause the high pressure gas cylinder to communicate with the outside. The communication hole is filled with the low melting point alloy and the communication hole is closed by the low melting point alloy normally solidified and composited in a state of the porous material is impregnated with the low melting point alloy. On the other hand, when the temperature becomes abnormally high, the low melting point alloy melts and is eluted from the porous body to the outside, so that the communication hole is opened and the contents (gas) in the container can be quickly released to the outside. The fusible plug of the present invention is made of a material similar to that of a normal fusible plug made of brass, stainless steel, or the like and is manufactured by a normal method such as cutting so as to have a desired shape and dimension.

In a fusible plug 1 of the present invention, after a porous material 3 is press-fitted so as to occupy a part of a communication hole 2 in the length direction, all or a part of the porous material 3 is impregnated with a low melting point alloy 4 to solidify and composite the low melting point alloy 4. This state is schematically illustrated in FIGS. 1A to 1H. The fusible plug 1 is connected to a high pressure gas cylinder 10 with a screw part or the like and a predetermined high pressure is applied to the low melting point alloy. The communication hole may have a stepped cross section so that the filled low melting point alloy or the like does not jump out to the outside with pressure from a high pressure side.

Figure 1B:
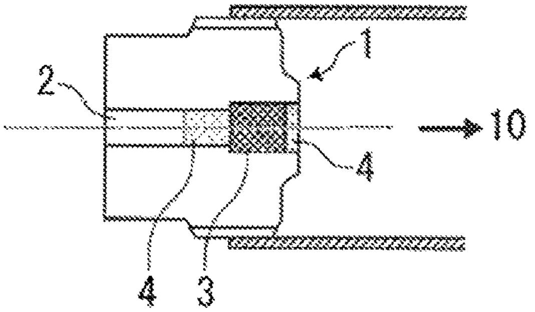
Figure 1F:
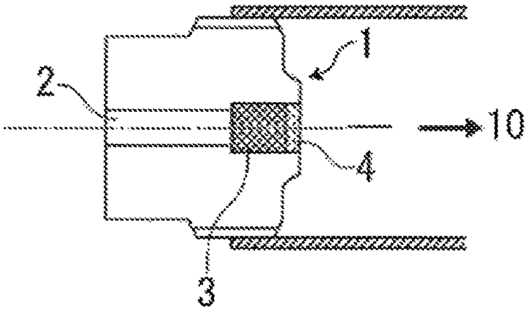
Figure 1C:
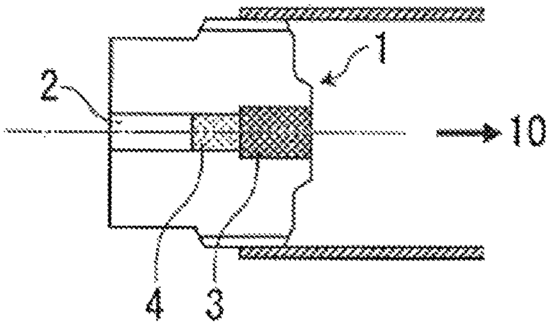
Figure 1G:
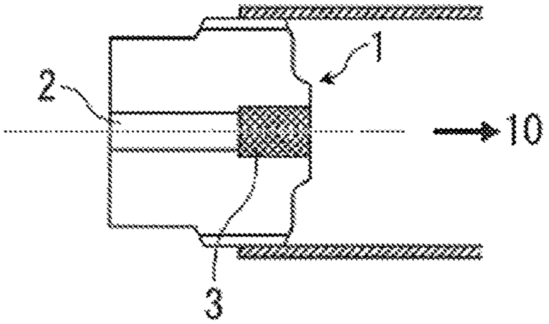
Figure 1D:
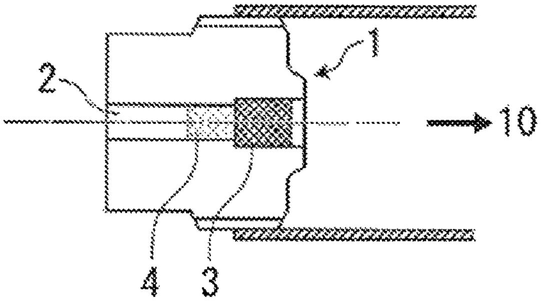
Figure 1H:
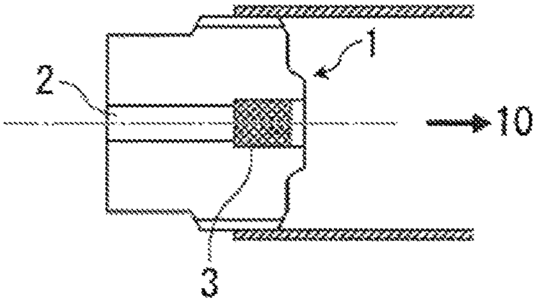

That is, in the fusible plug 1 of the present invention, all or a part of the porous material 3 press-fitted into the communication hole 2 is impregnated with the low melting point alloy 4 to composite the low melting point alloy 4. As a result, even when the fusible plug 1 is attached to the high pressure gas cylinder and the high pressure from the gas inside the container is applied to the low melting point alloy in the communication hole, the low melting point alloy is not displaced and the gas inside the container does not normally leak to the outside. The low melting point alloy impregnating all or a part of the porous material 3 and composited is reinforced by the porous material and retains high strength as a whole compared with the strength of only the low melting point alloy. As schematically shown in FIGS. 1A and 1B, the low melting point alloy 4 is sometimes filled in the communication hole 2 other than the porous material 3. However, as shown in FIGS. 1C to 1H, in the present invention, it is preferable from an economic viewpoint that the low melting point alloy 4 filled in the communication hole 2 other than the porous material 3 is reduced as much as possible. If the low melting point alloy can retain desired strength and sealability, a part of the porous material may be impregnated with the low melting point alloy to composite the low melting point alloy.

As the low melting point alloy to be filled in the communication hole of the fusible plug, an alloy matching a desired melting point only has to be selected. The low melting point alloy does not need to be limited in particular. The low melting point alloy is an alloy including two or more kinds of metal selected from Bi, Sn, In, Ag, Zn, and the like, and is preferably an alloy such as a bismuth Bi/indium In-based alloy, a bismuth Bi/indium In/tin Sn-based alloy, or a bismuth Bi/indium In/silver Ag-based alloy from the viewpoint of easily obtaining a low melting point. In the present invention, since the fusible plug is attached to the high pressure gas cylinder, from the viewpoint of safety and stability of functional characteristics, an alloy having a melting point of 110±5.5° C. is preferable as the low melting point alloy in use. Examples of such a low melting point alloy include a 67 mass % Bi-33 mass % In alloy.

In the present invention, the porous material to be press-fitted into the communication hole of the fusible plug is preferably a porous metal sintered body from the viewpoint of easily securing desired strength. As the porous metal sintered body, a porous metal sintered body having pores with an area ratio of 30% or more and preferably 50% or less and having pores with a diameter exceeding 5 μm among the pores with an area ratio of 80% or more with respect to all the pores can be exemplified.

When the pores of the porous metal sintered body are less than 30% in terms of area ratio, the pores of the porous sintered body are not impregnated with the molten metal of the low melting point alloy when impregnated with the low melting point alloy, and the low melting point alloy cannot be reinforced. Further, when exposed to an abnormally high temperature, the low melting point alloy melts and is released to the outside, and even if the communication hole becomes "open", the gas in the container cannot be quickly released to the outside. On the other hand, when the pores exceeds 50% in terms of area ratio, it is likely that the number of pores is too large, the strength is reduced, the low melting point alloy is deformed under high pressure, and strength reinforcement of a desired low melting point alloy becomes insufficient. Therefore, the porosity of the porous metal sintered body is preferably set to 30% or more and 50% or less. In addition, when the area ratio of pores having a diameter exceeding 5 μm among the pores is less than 80% with respect to all the pores, the amount of fine pores increases, and the pores of the sintered body are less easily impregnated with the molten metal of the low melting point alloy, so that it becomes difficult to secure desired strength. For this reason, the porous metal sintered body is preferably a porous metal sintered body having a porosity of 30% or more, preferably 50% or less in terms of area ratio as described above and having 80% or more of pores having a diameter exceeding 5 μm among the pores with respect to the total pore area.

As such a porous metal sintered body, a porous austenitic stainless steel sintered body is preferable. Since the fusible plug of the present invention is used in an indoor and outdoor high pressure gas environment, the porous metal sintered body is preferably a porous austenitic stainless steel sintered body excellent in corrosion resistance. Since the porous austenitic stainless steel sintered body is also excellent in hydrogen embrittlement resistance, the porous austenitic stainless steel sintered body is also suitable for use in a high pressure hydrogen gas environment. Examples of the austenitic stainless steel include SUS 201, SUS 202, SUS 301, SUS 302, SUS 303, SUS 303 Se, SUS 304, SUS 304 L, SUS 304 N1, SUS 304 N2, SUS 304 LN, SUS 305, SUS 309 S, SUS 310 S, SUS 316, SUS 316 L, SUS 316 N, SUS 316 LN, SUS 316 J1, SUS 316 J1L, SUS 317, SUS 317 L, SUS 317 J1, SUS 321, SUS 347, and SUH 660.

The porous metal sintered body is preferably a porous metal sintered body having transverse rupture strength of 50 MPa or more when being subjected to determination of transverse rupture strength conforming to the provisions of the Japan Powder Metallurgy Association Standard JPMA M09-1992 (corresponding ISO standard ISO 3325) to calculate the transverse rupture strength. When the transverse rupture strength of the porous metal sintered body is less than 50 MPa, sufficient strength of a fusible plug for a high pressure gas cylinder cannot be secured even when the low melting point alloy is composited in a state in which the porous material is impregnated with the low melting point alloy. Therefore, the transverse rupture strength of the porous metal sintered body is preferably set to 50 MPa or more. The transverse rupture strength is more preferably 100 MPa or more.

In addition, in the fusible plug of the present invention, the compressive yield strength of a region formed by compositing the low melting point alloy in a state in which the porous metal sintered body is impregnated with the low melting point alloy in the communication hole is preferably 1.5 times or more the compressive yield strength of only the low melting point alloy. In the fusible plug of the present invention, the porous metal sintered body is attached to at least a part of the communication hole in the length direction. However, when the compressive yield strength of the region formed by compositing the low melting point alloy in a state in which the porous metal sintered body is impregnated with the low melting point alloy is less than 1.5 times the compressive yield strength of only the low melting point alloy, strength reinforcement of a desired low melting point alloy cannot be performed and a fusible plug having desired pressure resistance cannot be obtained as a fusible plug for a high pressure gas cylinder. The compressive yield strength is more preferably 2.0 times or more.

The term "having desired pressure resistance" as used herein refers to a state in which leakage of contents is not observed against predetermined high pressure applied to the fusible plug in a state in which the fusible plug is connected to the high pressure gas cylinder. The fusible plug of the present invention having the above configuration has pressure resistance of 87.5 MPa or more.

Next, a preferred method for manufacturing the porous metal sintered body is explained.

After alloy powder, graphite powder, and lubricant powder used as raw materials are mixed to obtain mixed powder, the mixed powder is charged into a mold and pressure-molded to obtain a green compact, and the green compact is sintered to obtain a porous metal sintered body.

As the raw material powder, the alloy powder to be used is preferably alloy powder adjusted to have a particle size distribution that passes through a 30 mesh sieve (hereinafter, also referred to as 30 mesh under or −30 mesh) and does not pass through a 350 mesh sieve (hereinafter, also referred to as 350 mesh over or +350 mesh). When −350 mesh particles are present, an amount of presence of fine pores having a diameter of less than 5 μm increases, the molten metal of the low melting point alloy less easily infiltrates into the pores of the sintered body, and it becomes difficult to secure desired strength.

In addition, the alloy powder to be used is preferably austenitic stainless steel powder having the above-described particle size distribution from the viewpoint of oxidation resistance and corrosion resistance when being press-fitted into the fusible plug. Examples of preferable austenitic stainless steel include SUS 201, SUS 202, SUS 301, SUS 302, SUS 303, SUS 303 Se, SUS 304, SUS 304 L, SUS 304 N1, SUS 304 N2, SUS 304 LN, SUS 305, SUS 309 S, SUS 310 S, SUS 316, SUS 316 L, SUS 316 N, SUS 316 LN, SUS 316 J1, SUS 316 J1L, SUS 317, SUS 317 L, SUS 317 J1, SUS 321, SUS 347, and SUH 660. Examples of a lubricant to be used include zinc stearate.

The method for molding the green compact is not particularly limited. However, it is preferable to use a molding press or the like. The green compact molded into a predetermined shape is sintered to be a porous sintered body having a predetermined shape. Sintering conditions are preferably adjusted so as to have the porosity described above and so as to have transverse rupture strength of 50 MPa or more as calculated by a determination of transverse rupture strength conforming to the provisions of JPMA M09-1992.

The porous material (porous metal sintered body) obtained in this way is press-fitted into the communication hole of the fusible plug. It is preferable that the porous material is press-fitted so that a part of the communication hole in the length direction occupies the entire cross section. The press-fitting length of the porous material only has to be determined according to an environment to which the porous material is exposed. The press-fitting length does not need to be particularly limited. The press-fitting length only has to be length at which as the low melting point alloy can be reinforced to such an extent that the low melting point alloy is not displaced according to high pressure to which the low melting point alloy is exposed. For example, a porous material (porous metal sintered body) having transverse rupture strength of 50 MPa or more under an environment of high pressure of 87.5 MPa is preferable to be press-fit by about 3 mm to 15 mm in the longitudinal direction of the communication hole.

Subsequently, after the porous material (porous metal sintered body) is press-fitted into a part in the longitudinal direction of the communication hole of the fusible plug, the communication hole is further filled with a low melting point alloy in a molten state, and all or a part of the porous material (porous metal sintered body) is impregnated with the low melting point alloy to solidify and composite the low melting point alloy.

As a result, the low melting point alloy filled in the communication hole is reinforced by the porous material (porous metal sintered body), and the low melting point alloy as a whole maintains a strength 1.5 times or more higher than the compressive yield strength of only the low melting point alloy.

The present invention is further explained below with reference to Examples.

Example

The fusible plug 1 made of brass including the communication hole 2 drilled therein was manufactured. The communication hole 2 had a step as shown in FIGS. 1A to 1H.

Then, the porous metal sintered body 3 was press-fitted from the high pressure gas cylinder 10 side (diameter: 9 mmφ side) of the communication hole 2. The length of the press-fitted porous metal sintered body was set to 9 mm.

Subsequently, a low melting point alloy (67 mass % Bi-33 mass % In alloy: melting point 110° C.) was filled in a molten state in the communication hole into which the porous metal sintered body was press-fitted. The press-fitted porous metal sintered body was impregnated with the low melting point alloy to obtain a fusible plug in a state in which the low melting point alloy was solidified and composited. In addition, a fusible plug filled with the low melting point alloy so as to fill the entire communication hole without press-fitting the porous metal sintered body was used as a conventional example.

As shown in FIGS. 1A to 1H, the high pressure gas cylinder 10 was connected to one side of the obtained fusible plug 1 via a screw part, high pressure (87.5 MPa) was applied to the low melting point alloy in the communication hole at an environmental temperature of 85° C., and the pressure resistance of the fusible plug was evaluated.

The press-fitted porous metal sintered body was manufactured by the following method.

A lubricant powder was blended in a component-based alloy powder (steel powder) shown in Table 1, mixed, and kneaded to obtain mixed powder. The blended alloy powder (steel powder) was classified in advance to obtain SUS 316 steel powder in which a particle size distribution shown in Table 1 was adjusted. Subsequently, the obtained mixed powder was charged into a mold and pressure-molded by a molding press to obtain a green compact having a predetermined size (size: approximately 9 mmφ).

TABLE 1

| | | Particle size distribution of steel powder (% by mass) | | | | | |
|---|---|---|---|---|---|---|---|
| Steel Powder No. | Component-based | +30 mesh | −30 to +36 mesh | −36 to +42 mesh | −42 to +60 mesh | −60 to +100 mesh | −100 to +350 mesh |
| A | SUS316 | 10 | 45 | 35 | 6 | 3 | 1 |
| B | SUS316 | 3 | 7 | 15 | 49 | 24 | 2 |

Subsequently, the green compact was sintered at a sintering temperature of 1100 to 1350° C. to obtain a porous metal sintered body (porous austenitic stainless steel sintered body). The total porosity of the obtained porous metal sintered body was calculated by density measurement. The density was measured by the Archimedes method. In addition, a ratio of fine pores to all pores was calculated by imaging the structure of the cross section of the sintered body in a pressing direction with an optical microscope, calculating a total area of the fine pores having a diameter of 5 μm or less and an area of all the pores with an image analysis, and calculating (the total area of the fine pores having the diameter of 5 μm or less)/(the area of all the pores). The measurement was performed at three points on the circumference.

A test piece of transverse rupture strength (width: 10 mm, thickness: 6 mm, length: 40 mm) conforming to the provisions of JPMA M09-1992 was collected from a sintered body manufactured by the same manufacturing method as that of the porous metal sintered body described above, a determination of transverse rupture strength was performed, and transverse rupture strength was calculated. The transverse rupture strength is shown in Table 2. A roller having a diameter of 5 mm was used in the test. A center-to-center distance (distance between supporting points) of a supporting roller was set to 20 mm. The transverse rupture strength was calculated using the following equation.

$$\text{Transverse rupture strength}=(3\times F\times L)/(2\times b\times h^2)$$

where, F is a load (N) at the time when the test piece is broken,

L is a distance between supporting points (mm), b is a width of the test piece (mm), and h is a thickness of the test piece (mm).

Figure 2:
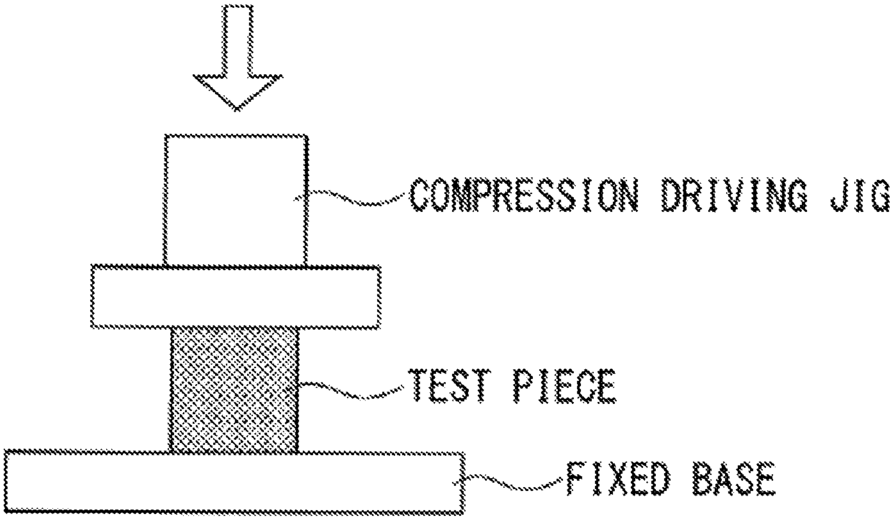
FIG. 2 is an explanatory diagram showing an overview of a method for measuring a compressive yield strength.

As in the example of the present invention explained above, a compression test piece (test piece size: 0 mm×8 mm) was collected from each of a region obtained by impregnating the porous metal sintered body with the low melting point alloy from the inside of the communication hole into which the porous metal sintered body was press-fitted and in which the low melting point alloy is further filled and solidifying and compositing the low melting point alloy and a region formed by only the low melting point alloy without impregnating the porous metal sintered body, and a compression test was carried out to determine the compressive yield strength. In the compression test, as shown in FIG. 2, a compression test piece was allowed to stand on a fixed base and was compressed at a displacement rate of 1 mm/sec via a compression driving jig, and compressive stress at the time of yield was obtained as a "compressive yield strength". From the obtained results, a ratio of the compressive yield strength (compressive yield strength of a region obtained by compositing the low melting point alloy)/(compressive yield strength of a region of only the low melting point alloy) was calculated. The obtained results are shown in Table 2.

TABLE 2

| | Mixed | Sintered body | | | | |
|---|---|---|---|---|---|---|
| Porous metal sintered body No. | powder Alloy powder* Type | Porosity (area %) | 5 μm or less fine pore ratio (%) | Transverse rupture strength (MPa) | Compressive yield strength ratio of low melting point alloy impregnated composited region (Compressive yield strength of low melting point alloy impregnated composited region)/(compressive yield strength of low melting point alloy) | Remarks |
| 1 | A | 55 | 3.0 | 19 | 1.3 | Comparative example |

TABLE 2-continued

| Porous metal sintered body No. | Mixed powder Alloy powder* Type | Sintered body Porosity (area %) | 5 μm or less fine pore ratio (%) | Transverse rupture strength (MPa) | Compressive yield strength ratio of low melting point alloy impregnated composited region (Compressive yield strength of low melting point alloy impregnated composited region)/(compressive yield strength of low melting point alloy) | Remarks |
|---|---|---|---|---|---|---|
| 2 | | 52 | 3.3 | 27 | 1.4 | Comparative example |
| 3 | | 49 | 4.1 | 55 | 1.8 | Conforming example |
| 4 | | 45 | 4.3 | 102 | 2.4 | Conforming example |
| 5 | | 40 | 5.0 | 176 | 3.0 | Conforming example |
| 6 | | 34 | 5.5 | 228 | 3.6 | Conforming example |
| 7 | | 30 | 5.9 | 252 | 4.0 | Conforming example |
| 8 | | 24 | 6.3 | 312 | Cannot be composited | Comparative example |
| 9 | | 20 | 6.5 | 361 | Cannot be composited | Comparative example |
| 10 | B | 56 | 3.5 | 28 | 1.4 | Comparative example |
| 11 | | 48 | 4.1 | 121 | 2.4 | Conforming example |
| 12 | | 45 | 4.4 | 196 | 3.2 | Conforming example |
| 13 | | 39 | 4.8 | 280 | 4.2 | Conforming example |
| 14 | | 33 | 5.2 | 376 | 5.3 | Conforming example |
| 15 | | 28 | 5.4 | 451 | Cannot be composited | Comparative example |

*See Table 1

As described above, among the porous metal sintered bodies press-fitted into the communication hole, the porous metal sintered body conforming to the scope of the present invention is a porous material having transverse rupture strength of 50 MPa or more and further having high compressive yield strength of 1.5 times or more as compared with the case of using only the low melting point alloy by impregnating the porous metal sintered body with the low melting point alloy and compositing the low melting point alloy.

Evaluation results of pressure resistance as a fusible plug are shown in Table 3.

In all of the present invention examples (the fusible plug), even when being exposed to an environmental temperature of 85° C., there was no displacement and no breakage of the low melting point alloy, and therefore, no release of contents was observed. When the fusible plug was heated to approximately 120° C., the low melting point metal was melted, and release of the contents was observed. As described above, the fusible plug of the present invention can be considered a fusible plug having pressure resistance of 87.5 MPa or more under an environment with an environmental temperature of up to 85° C. On the other hand, in the comparative examples outside the scope of the present invention, breakage or gas leaks occurred.

In the conventional example in which the porous metal sintered body was not press-fitted into the communication hole, displacement of the low melting point alloy was observed not only when the environmental temperature was 85° C. but also when the environmental temperature was room temperature.

TABLE 3

| Fusible Plug No. | Press-fitted porous sintered body No.* | Pressure resistance** | Remarks |
|---|---|---|---|
| 1 | 1 | x | Comparative example |
| 2 | 2 | x | Comparative example |
| 3 | 3 | o | Present inventive example |
| 4 | 4 | o | Present inventive example |
| 5 | 5 | o | Present inventive example |
| 6 | 6 | o | Present inventive example |
| 7 | 7 | o | Present inventive example |
| 8 | 8 | —*** | Comparative example |
| 9 | 9 | —*** | Comparative example |
| 10 | 10 | x | Comparative example |
| 11 | 11 | o | Present inventive example |
| 12 | 12 | o | Present inventive example |
| 13 | 13 | o | Present inventive example |
| 14 | 14 | o | Present inventive example |
| 15 | 15 | —*** | Comparative example |
| 16 | — | x | Conventional example |

*See Table 2.
**Conditions: environmental temperature: 85° C., pressure: 87.5 MPa
o No breakage or gas leaks
x There is damage or gas leaks.
***Not carried out

What is claimed is:

1. A fusible plug for a high pressure gas cylinder, comprising:

a communication hole; and a porous material attached to at least a part of the communication hole in a length direction, all or a part of the porous material being impregnated with a low melting point alloy to composite the low melting point alloy, wherein the porous material is a porous metal sintered body having pores with an area ratio of 30% or more and 50% or less and having pores with a diameter exceeding 5 μm among the pores of 80% or more in terms of area ratio with respect to all the pores, the porous metal sintered body having transverse rupture strength of 50 MPa or more as measured by determination of transverse rupture strength conforming to provisions of Japan Powder Metallurgy Association Standard JPMA M09-1992.

2. The fusible plug for a high pressure gas cylinder according to claim 1, wherein the low melting point alloy is an alloy having a melting point of 110±5.5° C.

3. The fusible plug for a high pressure gas cylinder according to claim 1, wherein the porous metal sintered body is a porous austenitic stainless steel sintered body.

4. The fusible plug for a high pressure gas cylinder according to claim 1, wherein a compressive yield strength of a region formed by impregnating the porous material with the low melting point alloy to composite the low melting point alloy is 1.5 times or more the compressive yield strength of the low melting point alloy.

5. The fusible plug for a high pressure gas cylinder according to claim 1, wherein the fusible plug has pressure resistance of 87.5 MPa or more at an environmental temperature of 85° C.

6. The fusible plug for a high pressure gas cylinder according to claim 2, wherein the porous metal sintered body is a porous austenitic stainless steel sintered body.

7. The fusible plug for a high pressure gas cylinder according to claim 2, wherein a compressive yield strength of a region formed by impregnating the porous material with the low melting point alloy to composite the low melting point alloy is 1.5 times or more the compressive yield strength of the low melting point alloy.

8. The fusible plug for a high pressure gas cylinder according to claim 3, wherein a compressive yield strength of a region formed by impregnating the porous material with the low melting point alloy to composite the low melting point alloy is 1.5 times or more the compressive yield strength of the low melting point alloy.

9. The fusible plug for a high pressure gas cylinder according to claim 6, wherein a compressive yield strength of a region formed by impregnating the porous material with the low melting point alloy to composite the low melting point alloy is 1.5 times or more the compressive yield strength of the low melting point alloy.

10. The fusible plug for a high pressure gas cylinder according to any of claims 2 and 3-4, wherein the fusible plug has pressure resistance of 87.5 MPa or more at an environmental temperature of 85° C.

11. The fusible plug for a high pressure gas cylinder according to any of claims 6-7, 8, and 9, wherein the fusible plug has pressure resistance of 87.5 MPa or more at an environmental temperature of 85° C.

* * * * *